Patented June 23, 1942

2,287,465

UNITED STATES PATENT OFFICE 2,287,465

AMINOMETHYL ETHERS OF ETHER ALCOHOLS

Louis H. Bock, Glenside, Pa., assignor to Röhm & Haas Company, Philadelphia, Pa.

No Drawing. Application March 26, 1940,
Serial No. 326,048

9 Claims. (Cl. 260—570.7)

This invention relates to tertiary aminomethyl ethers of ether alcohols and has for its object the preparation of these ethers.

It has been found that these aminomethyl ethers are efficiently made by reacting formaldehyde in an anhydrous form, a non-aromatic tetrasubstituted methylene diamine, and an ether alcohol under such conditions that the water formed in the reaction is removed. The reaction is most suitably carried out in an inert, water-immiscible solvent by heating under reflux. The water is preferably separated in a trap about as rapidly as formed and the reaction proceeds smoothly. As a small amount of formaldehyde and secondary amine from the methylene diamine is collected by the water, it is desirable to use a slight excess of formaldehyde or methylene diamine or both, although this is not essential.

The formaldehyde is preferably used in the form of paraformaldehyde which is a term applied to the solid polymers of formaldehyde which are found in commerce. These polymers vary somewhat in molecular size and include trioxymethylene as well as other polyoxymethylenes. A non-aqueous solution of formaldehyde or gaseous formaldehyde may also be used in this reaction.

The methylene diamines which are useful in this invention are obtainable by reacting formaldehyde and an aliphatic, alicyclic, or heterocyclic secondary amine, such as dimethylamine, diethylamine, diisobutylamine, diallylamine, methylcyclohexylamine, benzylmethylamine, methylcaprylamine, morpholine, piperidine, pyrrolidine, or the like. The reaction of formaldehyde and non-aromatic secondary amine leads to the formation of compounds of the general type $$R_1\!\!\diagdown\!\!N\text{---}CH_2\text{---}N\!\diagup\!\!R_1$$
$$R_2\diagup\qquad\qquad\diagdown R_2$$

in which $R_1$ and $R_2$ are non-aromatic hydrocarbon groups which may be identical or different or $R_1$ and $R_2$ may be taken together as a divalent group which forms a heterocycle with the nitrogen atom. These diamines are most conveniently called "non-aromatic tetrasubstituted methylene diamines" by which expression there are meant amines in which the nitrogens are linked to aliphatic, alicyclic or heterocyclic groups and are not directly linked to a phenyl or other aromatic ring.

The ether alcohols which are useful may have a great variety of substituents from the aliphatic, alicyclic, and aromatic series. The following are typical:

$CH_3\text{---}O\text{---}C_2H_4OH$
$C_2H_5\text{---}O\text{---}C_2H_4OH$
$CH_3CH(CH_3)\text{---}O\text{---}C_2H_4OH$ and longer chained members of this series;

$C_2H_5\text{---}O\text{---}C_2H_4\text{---}O\text{---}C_2H_4OH$
$C_4H_9\text{---}O\text{---}C_2H_4\text{---}O\text{---}C_2H_4OH$
$C_4H_9\text{---}O\text{---}C_2H_4\text{---}O\text{---}C_2H_4\text{---}O\text{---}C_2H_4OH$
$C_{11}H_{21}\text{---}O\text{---}C_2H_4OH$
$C_6H_{11}\text{---}O\text{---}C_2H_4OH$
Bornyl$\text{---}O\text{---}C_2H_4OH$
$C_6H_5\text{---}CH_2\text{---}O\text{---}C_2H_4OH$
$C_6H_5\text{---}O\text{---}C_2H_4OH$
$C_4H_9\text{---}C_6H_4\text{---}O\text{---}C_2H_4OH$
$C_6H_5\text{---}O\text{---}C_2H_4\text{---}O\text{---}C_2H_4OH$
$CH_3\text{---}C_6H_4\text{---}O\text{---}C_2H_4\text{---}O\text{---}C_2H_4OH$
$C_8H_{17}\text{---}C_6H_4\text{---}O\text{---}C_2H_4\text{---}O\text{---}C_2H_4OH$
$C_{10}H_7\text{---}CH_2\text{---}O\text{---}C_2H_4\text{---}O\text{---}C_2H_4OH$
$C_{10}H_7\text{---}O\text{---}C_2H_4OH$
$CH_3\text{---}CH_2\text{---}O\text{---}CH(CH_3)\text{---}CH_2OH$
$C_4H_9\text{---}O\text{---}CH(C_2H_5)\text{---}CH_2OH$

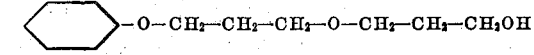

$C_6H_5\text{---}S\text{---}CH_2\text{---}CH_2OH$
$C_2H_5\text{---}O\text{---}C_6H_4\text{---}O\text{---}C_2H_4OH$
$CH_3\text{---}O\text{---}C_6H_4\text{---}O\text{---}C_2H_4\text{---}O\text{---}C_2H_4OH$ $$CH_3\text{---}\underset{\underset{O}{\|}}{C}\text{---}C_6H_4\text{---}O\text{---}C_2H_4OH$$

$$C_7H_{15}\text{---}\underset{\underset{O}{\|}}{C}\text{---}C_6H_4\text{---}O\text{---}C_2H_4OH$$

The ether alcohol, methylene diamine, and anhydrous formaldehyde are preferably reacted in an inert, water-immiscible solvent such as a petroleum ether, petroleum naphtha, benzene, toluene, etc. When the solvent is refluxed, the solvent carries with it water as it is formed. Separation of this water by means of a trap provides a simple method for removing the water, but other suitable means may be used. An alternative procedure is to remove the water as formed by chemical means or by an inert absorbent.

The reaction is illustrated by the following examples:

Example 1

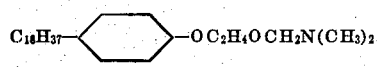

A mixture consisting of 83 parts of octadecyl phenoxyethanol, 150 parts of petroleum ether B. P. 55–100° C., 11 parts of tetramethyl methylene diamine and 3 parts of paraformaldehyde was refluxed in an apparatus having a trap attached to the condenser for removing water. 1.9 parts of water was obtained in two hours. The solvent was removed by evaporation under partial vacuum. Yield 96 parts.

In place of the octadecyl phenoxyethanol in the above example there may be used with similar results equivalent proportions of other alkyl phenoxyalcohols, such as α,α,γ,γ-tetramethylbutylphenoxyethanol, ter. butylphenoxyethanol, caprylphenoxyethanol, dodecylphenoxyethanol, or similar ethanols. Instead of the phenoxyethanol there may be used polyalkylene ether analogues such as octylphenoxyethoxyethanol or hexylphenoxyethoxyethanol. When such ether alcohols react as in the above example, there are formed compounds which are of particular interest and which may be represented by the formula

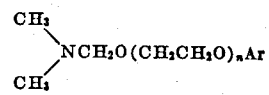

wherein $n$ is an integer from one to four inclusive and Ar is an alkylphenyl group.

Example 2

$C_4H_9OC_2H_4OC_2H_4OCH_2N(CH_3)_2$ 81 parts of butyl carbitol, 150 parts of petroleum ether, 27 parts of tetramethyl methylene diamine and 7.5 parts of paraformaldehyde were reacted as in Example No. 1. The product was distilled. B. P. 120° C./12 mm.–121° C./8 mm. Yield 80 parts.

Example 3

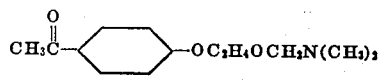

17 parts of acetylphenoxyethanol, 100 parts of petroleum ether, 6 parts of tetramethyl methylene diamine and 1.5 parts of paraformaldehyde were reacted as in Example No. 1. The product separated as an oil insoluble in the petroleum ether.

The products which are obtained are of the general formula

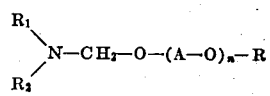

wherein $R_1$ and $R_2$ represent individually non-aromatic hydrocarbon groups or when taken jointly a saturated divalent group which forms a heterocycle with the nitrogen, A represents an alkylene group of at least two carbon atoms, $n$ represents an integer from one to four inclusive, and R represents a hydrocarbon group, an acylaryl group, or an alkoxyaryl group.

These products are useful as intermediates in the preparation of quaternary ammonium salts by reaction with an agent for alkylation such as benzyl chloride, methyl iodide, methallyl bromide, and the like. The quaternary compounds formed therefrom are useful as insecticides, germicides, and fungicides. Those having long chains are effective as textile assistants, dispersing agents, fixatives for dyes, etc.

I claim:

1. A method for preparing tertiary aminomethyl polyethers which comprises reacting a member of the group consisting of anhydrous preparations of formaldehyde and polymers of formaldehyde with a diamine of the formula

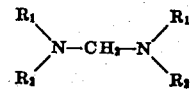

wherein $R_1$ and $R_2$ represent members of the group consisting of aliphatic and alicyclic hydrocarbon groups and aralkyl groups when taken individually and when taken together saturated divalent groups which jointly with the nitrogen form a heterocycle and an ether alcohol and removing the water formed in the reaction.

2. A method for preparing tertiary aminomethyl polyethers which comprises reacting anhydrous formaldehyde, a methylene diamine of the formula

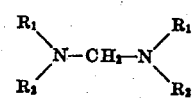

wherein $R_1$ and $R_2$ represents members of the group consisting of aliphatic and alicyclic hydrocarbon groups and aralkyl groups when taken individually and when taken together saturated divalent groups which jointly with the nitrogen form a heterocycle, and an ether alcohol and removing the water formed in the reaction.

3. A method for preparing tertiary aminomethyl polyethers which comprises reacting a mixture of paraformaldehyde, a methylene diamine of the formula

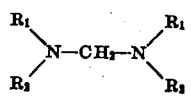

wherein $R_1$ and $R_2$ represent members of the group consisting of aliphatic and alicyclic hydrocarbon groups and aralkyl groups when taken individually and when taken together saturated divalent groups which jointly with the nitrogen form a heterocycle, and an ether alcohol by heating the mixture in an inert, water-immiscible solvent under reflux and separating water formed during the reaction.

4. A method for preparing a dimethylaminomethyl polyether which comprises reacting paraformaldehyde, tetramethyl methylene diamine and an ether alcohol by heating the mixture under reflux in an inert, water-immiscible solvent and separating the water formed during the reaction.

5. An aminomethyl polyether of the formula

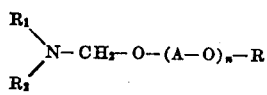

wherein $R_1$ and $R_2$ represent when taken individually non-aromatic hydrocarbon groups and when taken jointly a saturated divalent group which with the nitrogen forms a heterocycle, A represents an alkylene group of at least two carbon atoms, $n$ represents an integer from one to four inclusive, and R represents a member of the group consisting of hydrocarbon groups and carboxylic acylaryl and alkoxyaryl groups.

6. An aminomethyl polyether of the formula

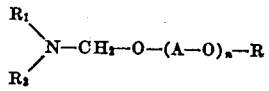

wherein $R_1$ and $R_2$ represent when taken individually non-aromatic hydrocarbon groups and when taken jointly a saturated divalent group which with the nitrogen forms a heterocycle, A represents an alkylene group of at least two carbon atoms, $n$ represents an integer from one to four inclusive, and R represents a hydrocarbon group.

7. A compound of the formula

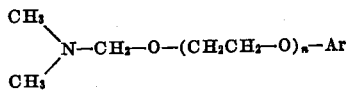

wherein $n$ represents an integer from one to four inclusive and Ar represents an alkylphenyl group.

8. A compound of the formula

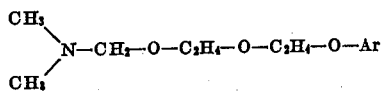

wherein Ar represents an alkyl phenyl group.

9. A compound of the formula

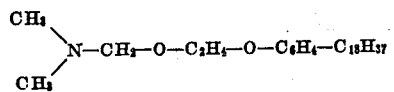

LOUIS H. BOCK.